US009645646B2

(12) United States Patent
Cowley et al.

(10) Patent No.: US 9,645,646 B2
(45) Date of Patent: May 9, 2017

(54) THREE DIMENSIONAL CONTEXTUAL FEEDBACK WRISTBAND DEVICE

(71) Applicant: Intel Corporation, Santa Clara, CA (US)

(72) Inventors: Nicholas P Cowley, Wroughton (GB); Richard J Goldman, Cirencester (GB); Ruchir Saraswat, Swindon (GB)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/477,122

(22) Filed: Sep. 4, 2014

(65) Prior Publication Data

US 2016/0070348 A1    Mar. 10, 2016

(51) Int. Cl.
*G06F 3/01*    (2006.01)
*G06F 3/0346*    (2013.01)

(52) U.S. Cl.
CPC .................................... *G06F 3/016* (2013.01)

(58) Field of Classification Search
CPC ...................................................... G06F 3/016
See application file for complete search history.

(56) References Cited

U.S. PATENT DOCUMENTS

| 6,218,958 | B1 * | 4/2001 | Eichstaedt | ............... | G08B 6/00 |
| | | | | | 340/4.12 |
| 6,359,550 | B1 * | 3/2002 | Brisebois | ............... | H04M 19/04 |
| | | | | | 340/311.2 |
| 9,134,834 | B2 * | 9/2015 | Reshef | .................... | G06F 3/016 |
| 2004/0137959 | A1 * | 7/2004 | Salzhauer | ................ | G08B 1/08 |
| | | | | | 455/567 |
| 2008/0300055 | A1 * | 12/2008 | Lutnick | ............... | G07F 17/3209 |
| | | | | | 463/39 |
| 2011/0102332 | A1 * | 5/2011 | Birnbaum | ............... | G06F 3/014 |
| | | | | | 345/173 |
| 2011/0115709 | A1 | 5/2011 | Cruz-Hernandez | | |
| 2011/0163946 | A1 | 7/2011 | Tartz et al. | | |
| 2014/0002248 | A1 | 1/2014 | Zawacki et al. | | |
| 2014/0062892 | A1 * | 3/2014 | Dickinson | ............. | G06F 3/0412 |
| | | | | | 345/173 |
| 2014/0160050 | A1 | 6/2014 | Olien et al. | | |
| 2015/0331488 | A1 * | 11/2015 | Grant | ...................... | G06F 3/011 |
| | | | | | 715/702 |

(Continued)

FOREIGN PATENT DOCUMENTS

EP    1505550 A1    2/2005

OTHER PUBLICATIONS

International Search Report and Written Opinion received for International Application No. PCT/US2015/041159, mailed on Nov. 6, 2015, 14 pages.

(Continued)

*Primary Examiner* — Joseph Haley
*Assistant Examiner* — Karin Kiyabu
(74) *Attorney, Agent, or Firm* — Alpine Technology Law Group LLC

(57) ABSTRACT

A device to output two or more coordinated haptic effects, comprising, a first haptic effect generator to output a first haptic effect, a second haptic effect generator to output a second haptic effect and a processor to coordinate operation of the second haptic effect generator with operation of the first haptic effect generator based on an input provided to the processor.

11 Claims, 5 Drawing Sheets

(56) References Cited

U.S. PATENT DOCUMENTS

| | | | | |
|---|---|---|---|---|
| 2015/0347075 | A1* | 12/2015 | Levesque | G06F 3/1423 |
| | | | | 345/3.1 |
| 2016/0018890 | A1* | 1/2016 | Deokar | G06F 3/016 |
| | | | | 715/702 |
| 2016/0018920 | A1* | 1/2016 | Deokar | G06F 3/044 |
| | | | | 345/174 |
| 2016/0370863 | A1* | 12/2016 | Jones | G06F 3/016 |

OTHER PUBLICATIONS

Duncombe et al., "Controlling Liquid Drops with Texture Ratchets", Materials Views, Advances Materials, 2012, pp. 1545-1550.

Erdem et al., "Vibration Induced Droplet Generation on Textured Surfaces", 3Components Research, Intel Corporation, Jan. 13-17, 2008, pp. 603-606.

Kim et al., "Tactile Rendering of 3D Features on Touch Surfaces", Oct. 11, 2013, 8 pages.

Microsoft Research, "Actuated 3-D Display with Haptic Feedback", Jul. 1, 2013, 1 page.

Baskaran, Rajashree, "Multimodal Haptic Effect System", U.S. Appl. No. 14/314,806, filed Jun. 25, 2014, 36 pages.

International Preliminary Report on Patentability received for International Application No. PCT/US2015/041159, mailed on Mar. 16, 2017, 10 pages.

\* cited by examiner

THREE DIMENSIONAL CONTEXTUAL FEEDBACK WRISTBAND DEVICE

TECHNICAL FIELD

Examples described herein generally relate to methods, systems, and devices to provide a haptic response system for a mobile device.

BACKGROUND

A wide range of wearable products are enabled with haptic devices to provide physical feedback to a user. Conventional products deploy individual haptic devices which provide single point feedback to the user.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

Figure 1:
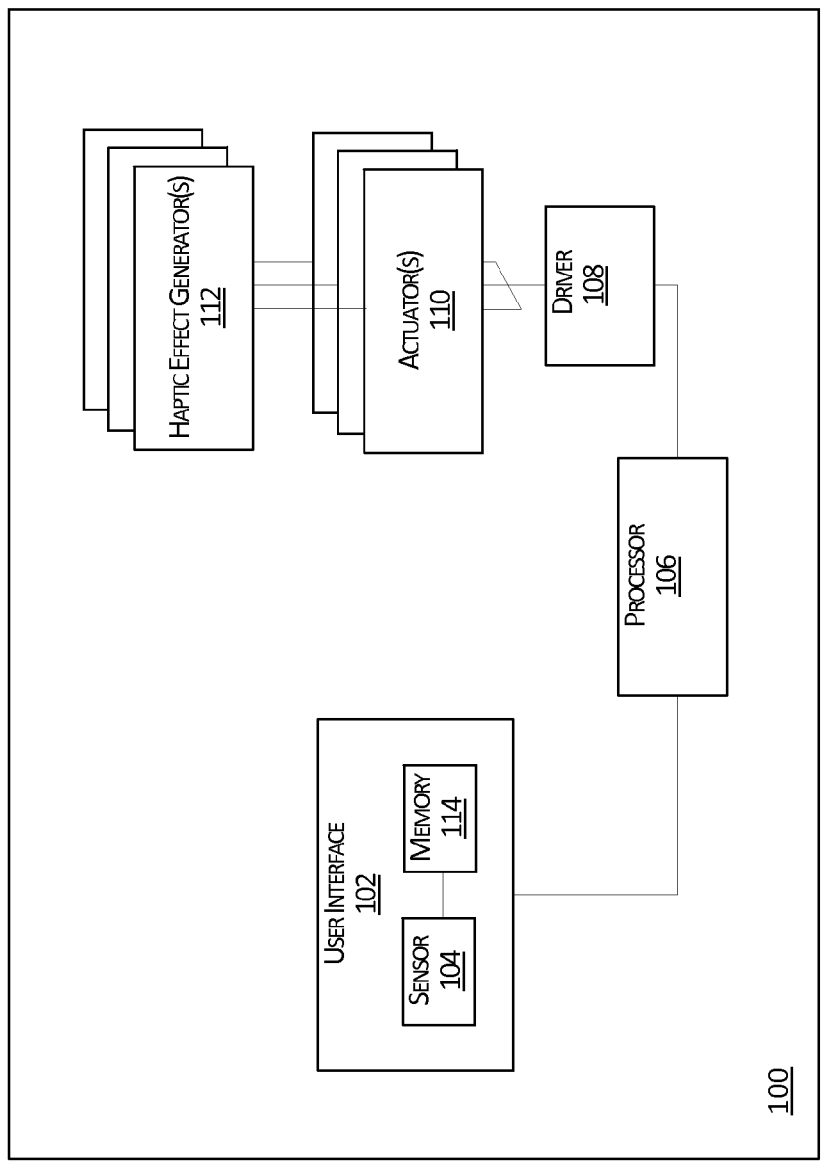
FIG. 1 is a block diagram illustrating an example of a haptic effect device.

FIG. 1 is a block diagram illustrating an example of a haptic effect device 100. Haptic device 100 may comprise a user interface 102, sensor 104, processor 106, driver 108, actuator 110, memory 114 and two or more haptic effect generators 112. In an example, two or more haptic effect generators 112 may be configured to generate one or more haptic effects. Processor 106, may be configured to coordinate such haptic effects with respect to one another. In one or more embodiments, coordination of haptic effects may refer to controlling two or more haptic effect generators 112 together to provide a haptic effect that is a combined haptic effect and/or multiple haptic effects in response to one or more inputs provided to processor 106, although the scope of the claimed subject matter is not limited in this respect. For example, processor 106 may coordinate two or more haptic effect generators 112 to operate in sequence wherein a first haptic effect generator 112 operates to provide a haptic effect over a first range of an input, and a second haptic effect generator operates to provide a haptic effect over a second range of an input, wherein the haptic effect generators 112 may operate alone or in unison with one or more other haptic effect generators 112. In another example, processor 106 may coordinate two or more haptic effect generators 112 wherein a first haptic effect generator 112 provides a first haptic effect in response to a first input, and a second haptic effect generator 112 provides a second haptic effect in response to a second input. As will be discussed herein in further detail with respect to example embodiments, in one or more embodiments, one or more sensors may provide the input to processor 106, and in one or more embodiments one or more of the haptic generators 112 may provide the input to the processor 106 as feedback to processor 106. In general, processor 106 may operate to control multiple haptic effect generators 112 in a coordinated manner to provide a combined and/or more complex haptic effect, for example to provide multiple haptic effects in sequence and/or, simultaneously, and/or in any combination, and/or multidimensional haptic effects and/or haptic effects that are responsive to multiple inputs including multidimensional, multi-position, multi-orientation and/or multi-sensor inputs, although the scope of the claimed subject matter is not limited in these respects. Processor 106 may be configured to associate, synchronize and/or otherwise coordinate two or more haptic effects dynamically and/or statically. Processor 106 may associate, synchronize and/or otherwise coordinate such haptic effects by controlling the operation of two or more haptic effect generators 112 based on a received input. In an example, a first haptic effect that is associated, synchronized and/or otherwise coordinated with a second haptic effect may have corresponding features such as timing, frequency, amplitude, tension, temperature, contour, texture, pressure, pain, compression, and/or the like or a combination thereof, of the first and second haptic effects. As will be explained in greater detail herein, such associated, synchronized and/or otherwise coordinated first and second haptic effects may be perceived by a user to be a unified action, a smoothly progressing action, an action having a direction, an action having a dimensionality, or the like or combination thereof.

In an example, user interface 102 may be configured to receive and/or communicate input data to processor 106. In an example, processor 106 may comprise a controller or microcontroller. Processor 106 may be configured to process the input data from user interface 102 and associate the input data with one or more haptic effects to be generated by one or more haptic effect generators 112. To generate such haptic effects, processor 106 may be configured to communicate one more commands to driver 108. Driver 108 may be a single or multiple drivers co-located and or separately disposed. Driver 108 may drive one or more actuators 110 based on the one or more commands. One or more actuators 110 may be coupled to respective one or more haptic effect generators 112 and may comprise any of a variety of devices configured to move or cause motion. For example, any of actuators 110 may comprise an Eccentric Rotating Mass (ERM), a Linear Resonant Actuator (LRA) a Piezoelectric Actuator (PA), an electroactive polymer, an electrostatic actuator, a subsonic audio wave surface actuator, a reverse-electrovibration style actuator, pressure sensitive actuator or the like or a combination thereof.

In an example, one or more of actuators 110 may be coupled to a corresponding one of haptic effect generator 112 or a single one of actuators 110 may be coupled to two or more haptic effect generators 112. One or more actuators 110 may be configured to output one or more haptic effects. One or more actuators 110 may be configured to exert a variety of forces on one or more haptic effect generators 112 to actuate a variety of haptic effects. One or more forces may be associated with a particular haptic effect and may include one or more vibrations, electrostatic forces, electrical signals, sound waves, heat, compression, physical forces or the like, or combinations thereof. In another example, one or more drivers 108 may be coupled to one or more haptic effect generators 112 and may send one or more electrical signals to haptic effect generator 112 to generate one or more haptic effects.

In an example, two or more haptic effect generators 112 may operate in a coordinated way to provide two or three dimensional physical sensory feedback. Such two or three dimensional physical sensory feedback may indicate to a user a state of a parameter such as a measured physical parameter detected by sensor 104. In another example, the physical parameter need not be sensed by sensor 104, rather the physical parameter may be reported or provided as a user input and/or from another source such as a Graphics Processing Unit (GPU), a Global Positioning Unit (GPS), a weather station, a server or the like or a combination thereof.

In an example, one of haptic effect generators 112 may respond with a haptic effect when the physical parameter is detected to be below a threshold metric. A different one of haptic effect generators 112 may respond with a haptic effect when the physical parameter is detected to be above the threshold metric. One or more haptic effect generators 112 may be disposed in device 100 to permit physical discrimination by a user between individual sensations generated by one or more haptic effect generators 112.

In an example, haptic effect device 100 may be any of a variety of devices enabled to output one or more haptic effects. For example, haptic effect device 100 may comprise a video game controller, a wristband, a mobile communications device, a mobile computing device, a tablet, a notebook, a detachable slate device, an Ultrabook™ system, a wearable communications device, a personal computer, a wearable computer, a smart shoe, an entertainment device, an electronic device, a wearable electronic device and/or the like or a combination thereof. In such devices, haptic effects may be transmitted through any surface of the device, for example, a screen, a backside, a top side, a bottom side, a left or right side, or the like or a combination thereof. Haptic effects may include vibration, tension, contour, pressure, pain, temperature change, texture change, compression, and/or the like or combinations thereof.

In an example, user interface 102 and/or sensor 104 may be disposed in or on haptic device 100. In another example, user interface 102 and/or sensor 104 may be separate from haptic device 100. In an example, user interface 102 may be configured to receive a user input such as a physical input, a button push, a trigger actuation, a haptic input, an audio input, a preset input and/or trigger, a thermal input, a location and/or the like or a combination thereof.

In an example, user interface 102 may comprise a touchscreen, a keyboard, a button, a wheel, a mouse, a touchpad, a microphone, a wearable computer, a wearable communications device, a wearable medical device, a wearable and/or embedded medical monitor and/or the like or combinations thereof. User interface 102 may comprise a sensor 104 and/or sensor 104 may be separate from or together with user interface 102. Sensor 104 may be configured to receive a user input and/or sense one or more physical phenomena such as temperature, light, pressure, sound, motion, moisture, location, a chemical composition, an electrical signal, a vital sign and/or the like or a combination thereof. Sensor 104 may comprise any of a variety of sensors such as, a location sensor, a motion sensor, a touch sensor, a light sensor, a biometric sensor, a current sensor, a thermal sensor, a pressure sensor and/or the like, or a combination thereof. Sensor 104 may comprise a single sensor or multiple sensors. Such multiple sensors may be arranged in an array, dispersed over a surface, randomly arranged, or the like or a combination thereof.

In an example, user interface 102 and/or sensor 104 may be coupled to processor 106 and/or memory 114. Processor 106 may be configured to receive and process input data and/or sensor data directly from user interface 102, sensor 104, one or more actuators 110, one or more haptic effect generators 112, driver 108 and/or from memory 114. Processor 106 may select a command associated with an algorithm and/or set of instructions to be executed by driver 108 responsive to the input data and/or sensor data. Such an algorithm and/or set of instructions may be configured to cause driver 108 to drive one or more actuators 110 in association with one another by synchronizing and/or otherwise coordinating the haptic output of the haptic effect generators 112 with respect to one another. One or more actuators 110 may cause haptic effect generators 112 to output one or more haptic effects associated with the input data and/or sensor data. In another example, such an algorithm and/or set of instructions may be configured to cause driver 108 to send a signal to haptic effect generators 112 to output one or more haptic effects associated with the input data and/or sensor data.

Figure 2:
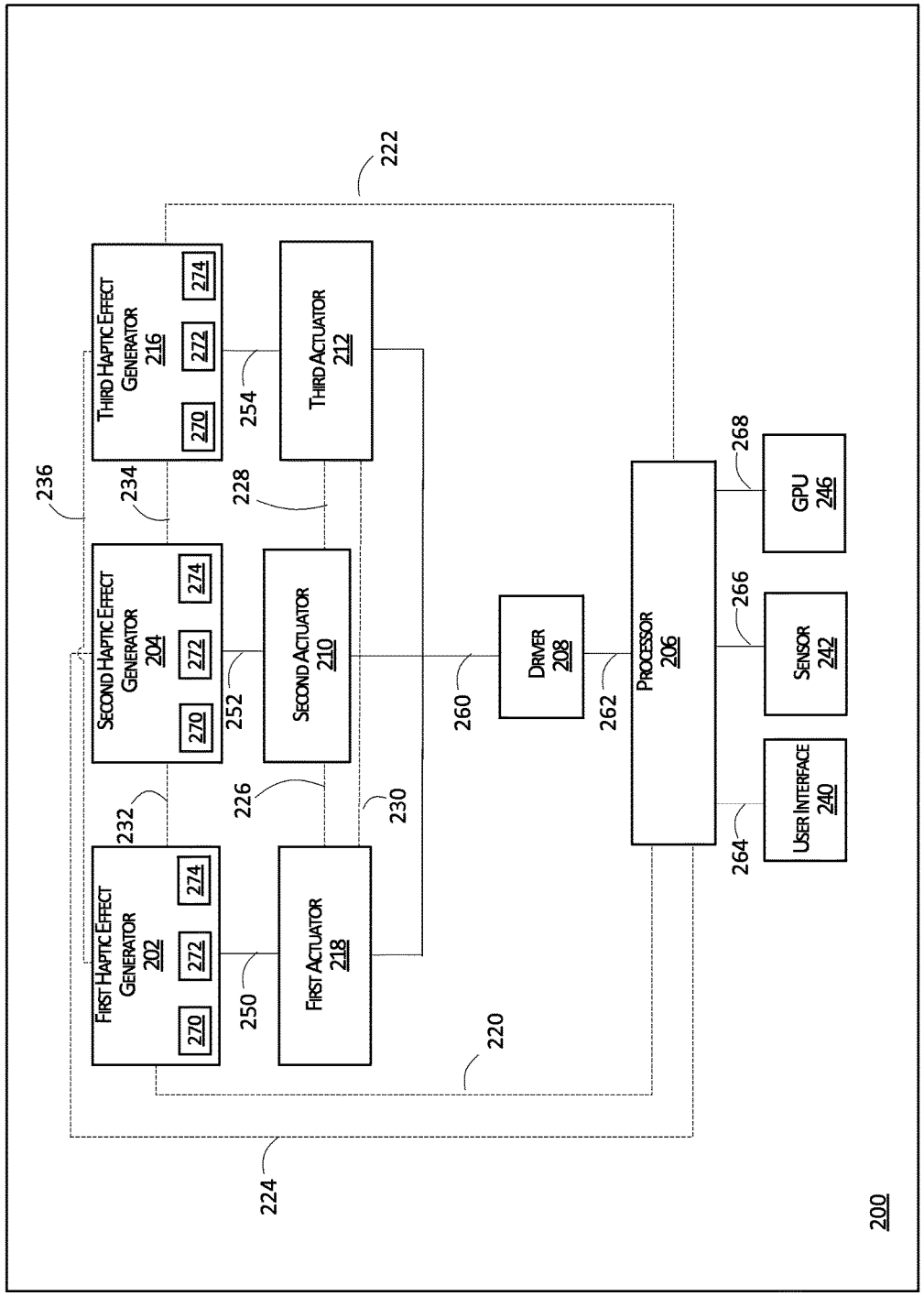
FIG. 2 is a block diagram illustrating an example of a haptic effect device.

FIG. 2 is a block diagram of a haptic device 200. In an example, haptic device 200 may comprise processor 206 coupled to driver 208 via communication line 262. Processor 206 may be a controller. Processor 206 may comprise a processor, a graphics processing unit (GPU) for a video game, a memory, input/output ports and/or the like or combinations thereof. Processor 206 may comprise an embedded microcontroller. Processor 206 may be coupled to a graphics processing unit (GPU) and/or may send and/or receive data from the GPU. Processor 206 may be configured to control haptic effects generated by one or more haptic effect generators, for example, by first haptic effect generator 202, second haptic effect generator 204 and/or third haptic effect generator 216 via driver 208. Driver 208 may be coupled to first actuator 218, second actuator 210, and/or third actuator 212. Driver 208 may be configured to communicate with and/or drive first haptic effect generator 202, second haptic effect generator 204 and/or third haptic effect generator 216 via first actuator 218, second actuator 210, and/or third actuator 212 via communication line 260.

In an example, processor 206 may be configured to select commands from a database to control haptic effects and/or to dynamically generate commands to control haptic effects based on data received from one or more of several sources of feedback and/or status data including first haptic effect generator 204, second haptic effect generator 204 and/or third haptic effect generator 216, first actuator 218, second actuator 210 and/or third actuator 212, user interface 240, sensor 242 and/or GPU 246. Commands may be sent to driver 208 from processor 206 to be implemented by first haptic effect generator 202, second haptic effect generator 204 and/or third haptic effect generator 216.

In an example, one or more of first haptic effect generator 202, second haptic effect generator 204 and/or third haptic effect generator 216 may comprise a processor 270, transmitter 272, receiver 274 and/or additional or other circuitry. Processor 270 may be configured to detect and/or otherwise identify status information associated with respective ones of first haptic effect generator 202, second haptic effect generator 204 and/or third haptic effect generator 216. Such status information may comprise data associated with haptic effects generated and may indicate a frequency of vibration, amplitude of vibration, duration of haptic effects generated, and the like or a combination thereof. Status information may be communicated from processor 270 to processor 206 via wireline and/or wireless communication via transmitter 272 to be processed, for example, to select commands to associate, synchronize and/or otherwise coordinate haptic effects between one or more of first haptic effect generator 202, second haptic effect generator 204 and/or third haptic effect generator 216. In an example, sensor 242 may be configured to detect status information associated with operation of and/or one or more haptic effects generated by one or more of first haptic effect generator 202, second haptic effect generator 204 and/or third haptic effect generator 216. Sensor 242 may be disposed on and/or near one or more of first haptic effect generator 202, second haptic effect generator 204 and/or third haptic effect generator 216 to facilitate detection of such status data. Sensor 242 may be located remotely from one or more of first haptic effect generator 202, second haptic effect generator 204 and/or third haptic effect generator 216 and claimed subject matter is not so limited.

In an example, haptic device 200 may be configured to be worn by a user and processor 206 may be coupled to user interface 240 and/or sensor 242. Processor 206 may be configured to receive user input data from user interface 240 via communication line 264, receive sensor data from sensor 242 via communication line 266 and/or receive game data from GPU 246 via communication line 268. Processor 206 may be configured to select and/or dynamically generate one or more commands for controlling haptic effects produced by first haptic effect generator 202, second haptic effect generator 204 and/or third haptic effect generator 216 based on the user input data and/or sensor data.

In an example, user interface 240 and/or sensor 242 may be incorporated into haptic device 200 such that user interface 240 and/or sensor 242 are in contact with the user. User data supplied by user interface 240 and/or sensor data generated by sensor 242 may identify a state of a measured parameter such as a user's location, a user's orientation in three dimensional space, a temperature (user's or ambient), a user's heart rate, a user's blood pressure, a tension on an elastic band around a user's body part, or the like or a combination thereof. Processor 206 may select and/or dynamically generate one or more commands responsive to the sensor data to, for example, activate first haptic effect generator 202 when the parameter is below a threshold value, activate third haptic effect generator 216 when the parameter is above the threshold value, and/or activate the second haptic effect generator when the parameter value is within a particular range of the threshold value. In an example, placement of first haptic effect generator 202, second haptic effect generator 204 and/or third haptic effect generator 216 may permit physical discrimination between the individual sensations caused by the first haptic effect generator 202, second haptic effect generator 204 and/or third haptic effect generator 216. In an example, communication lines 260, 262, 264 and/or 266 may comprise a wire line or wireless communications system. Such wireless communications systems may include, a Radio Frequency Identification (RFID) system, a Wi-Fi™ system, a Bluetooth™ system, a Zigbee™ system, WiMax™ system, through body communication (TBC) or the like or a combination thereof.

In an example, haptic device 200 may be configured to be worn by a user and processor 206 may be coupled to one or more of first haptic effect generator 202, second haptic effect generator 204 and/or third haptic effect generator 216 via respective ones of communication lines 220, 222 and/or 224. First haptic effect generator 202, second haptic effect generator 204 and/or third haptic effect generator 216 may be configured to provide status and/or other data to processor 206 to identify particular information about haptic effects generated by respective haptic effect generators 202, 204 and/or 216. For example, first haptic effect generator 202, second haptic effect generator 204 and/or third haptic effect generator 216 may send a signal to processor 206 indicating that an amplitude and/or frequency of the respective haptic effect generator is on, off, ramping up, ramping down or holding steady, or the like or a combination thereof.

In an example, sensor 242 may generate the same or similar data related to a status of first haptic effect generator 202, second haptic effect generator 204 and/or third haptic effect generator 216. Processor 206 may be configured to select and/or dynamically generate one or more commands for controlling haptic effects produced by first haptic effect generator 202, second haptic effect generator 204 and/or third haptic effect generator 216 based on the status data. For example, first haptic effect generator 202, second haptic effect generator 204 and/or third haptic effect generator 216 may be incorporated into haptic device 200 such that they are in physical contact with the user. In an example, communication lines 220, 222, and/or 224 may comprise a wire line or wireless communications system. Such wireless communications systems may include, a Radio Frequency Identification (RFID) system, a Wi-Fi™ system, a Bluetooth™ system, a Zigbee™ system, WiMax™ system, through body communication (TBC) or the like or a combination thereof.

In an example, sensor data generated by sensor 242 may identify a state of a measured parameter. First haptic effect generator 202, second haptic effect generator 204 and/or third haptic effect generator 216 may send status data to processor 206. Processor 206 may select and/or dynamically generate one or more commands responsive to the sensor data and/or the status data.

In an example, processor 206 may be configured to activate a haptic effect in first haptic effect generator 202. The haptic effect may be configured to convey detailed information about the measured parameter. For example, when the measured parameter is approaching a threshold value from below the threshold value, the haptic effect executed by first haptic effect generator 202 may comprise ramping up of the amplitude of vibration to indicate that the value of the measured parameter is increasing toward the threshold value.

In an example, processor 206 may receive status updates from first haptic effect generator 202 and/or updated sensor data from sensor 242. For example, the parameter value may continue increasing toward the threshold value. To convey this information haptically to the user, processor 206 may be configured to activate second haptic effect generator 204 to vibrate with a ramping amplitude starting at the amplitude as last indicated in the status of the first haptic effect generator 202. Similarly, processor 206 may receive status updates from second haptic effect generator 204 and/or updated sensor data from sensor 242. For example, the parameter value may reach the threshold value and/or continue increasing beyond the threshold value. To convey this information haptically to the user, processor 206 may be configured to activate third haptic effect generator 216 to vibrate with a ramping amplitude starting at the amplitude as last indicated in the status of the second haptic effect generator 204. Thus, the user may perceive an associated, synchronized and/or otherwise coordinated ramping amplitude and a brush or stroking sensation across the three haptic effect generators 202, 204 and 216 indicating that a measured parameter is continuing to increase and has surpassed a threshold value.

In an example, first actuator 218, second actuator 210, and/or third actuator 212 may be coupled to respective ones of first haptic effect generator 202, second haptic effect generator 204 and/or third haptic effect generator 206 via communication lines 250, 252 and/or 254. First actuator 218, second actuator 210, and/or third actuator 212 may be coupled to one or more others of first actuator 218, second actuator 210, and/or third actuator 212 via one or more communication lines 226, 228 and/or 230. First actuator 218, second actuator 210, and/or third actuator 212 may be configured to receive and respond to status data from another of first actuator 218, second actuator 210, and/or third actuator 212. For example, a status data signal received by second actuator 210 from first actuator 218 indicating that a particular haptic effect has been triggered by first actuator 218 may delay actuation of a related haptic effect by second actuator 210. In an example, communication lines 226, 228, 230, 250, 252, and/or 254 may comprise a wire line or wireless communications system. Such wireless communications systems may include, a Radio Frequency Identification (RFID) system, a Wi-Fi™ system, a Bluetooth™ system, a Zigbee™ system, WiMax™ system, TBC or the like or a combination thereof.

In an example, first haptic effect generator 202, second haptic effect generator 204 and/or third haptic effect generator 216 may be coupled to one or more others of first haptic effect generator 202, second haptic effect generator 204 and/or third haptic effect generator 216 via respective ones of communication lines 232, 234 and/or 236.

In an example, first haptic effect generator 202, second haptic effect generator 204 and/or third haptic effect generator 216 may be configured to receive and respond to status data from another of first haptic effect generator 202, second haptic effect generator 204 and/or third haptic effect generator 216. For example, a status data signal received by second haptic effect generator 204 from first haptic effect generator 202 indicating triggering and/or cessation of a haptic effect executed by first haptic effect generator 202 may trigger execution of a sympathetic and/or related haptic effect in second haptic effect generator 204. In an example, communication lines 232, 234, and/or 236 may comprise a wire line or wireless communications system. Such wireless communications systems may include, a Radio Frequency Identification (RFID) system, a Wi-Fi™ system, a Bluetooth™ system, a Zigbee™ system, WiMax™ system, TBC or the like or a combination thereof.

Figure 3:
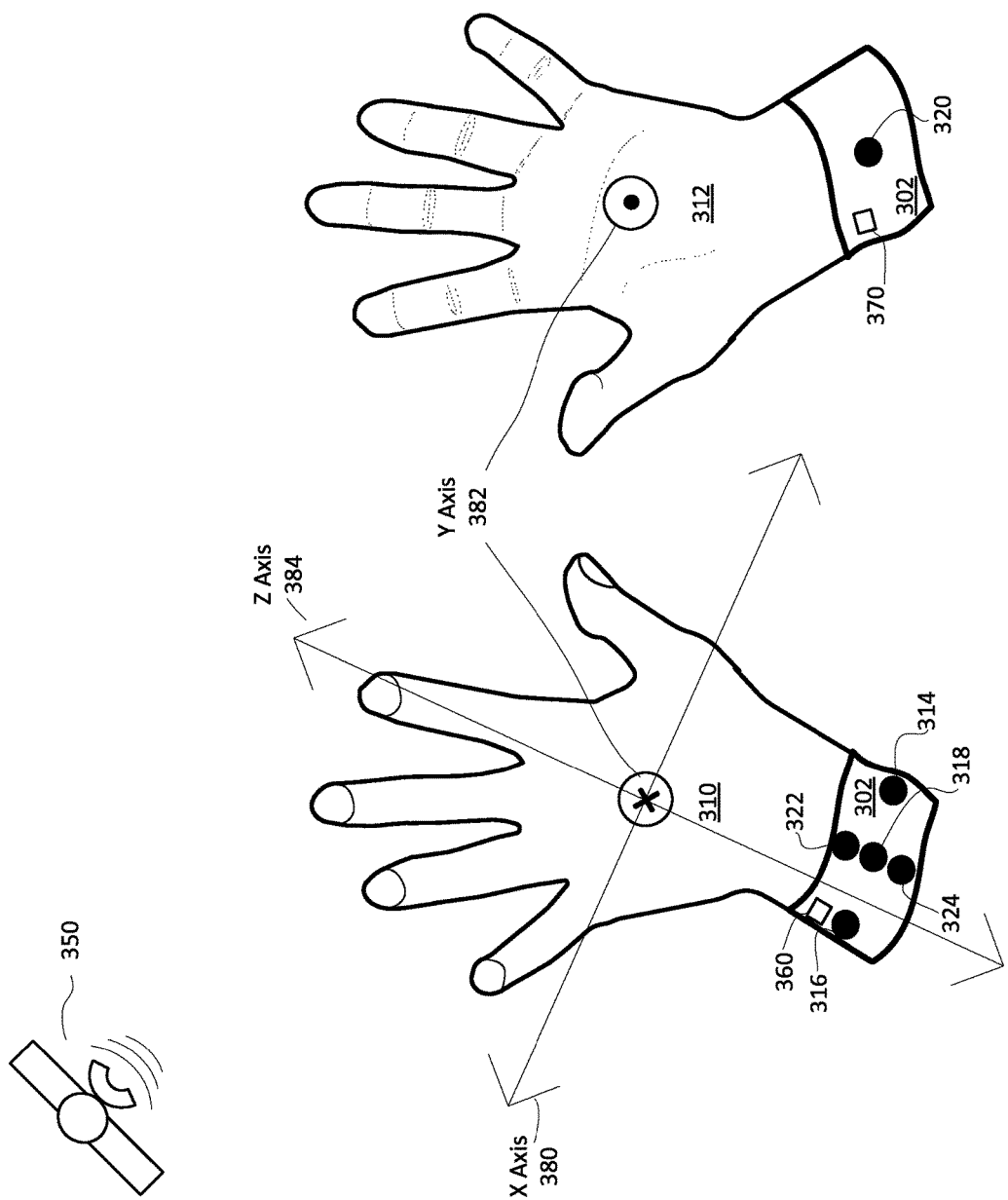
FIG. 3 illustrates an example of a haptic device configured to be worn as a wristband.

FIG. 3 illustrates an example of a haptic device 300 configured to be worn as a wristband 302. In FIG. 3, a backhand perspective 310 and a palm side perspective 312 of haptic effect device 300 are shown. Haptic device 300 may be configured to provide a variety of two or three dimensional coordinated haptic effects along the X axis 380, Y axis 382 and/or the Z axis 384. For example, haptic effect device 300 may be integrated with a navigation system 350. Haptic effects generated by haptic effect device 300 may be dynamically coordinated with navigational directions generated by navigational system 350 to provide a user wearing haptic effect device 300 with a navigational aid to provide feedback to the user while following the navigational directions.

In an example, haptic effect device 300 may provide information via haptic effects in the X axis 380, Y axis 382 and/or the Z axis 384. First haptic effect generator 314 and second haptic effect generator 316 may be disposed on the inner and outer wrist area, respectively, and may be configured to generate haptic effects in the X direction along the X axis 380. Third haptic effect generator 318 and fourth haptic effect generator 320 may be disposed on an upper and lower wrist area, respectively, and may be configured to generate haptic effects in the Y direction along the Y axis 382. Fifth haptic effect generator 322 and sixth haptic effect generator 324 may be disposed in the Z direction wherein haptic effect generator 322 is disposed closer to the hand and haptic effect generator 324 is disposed farther from the hand. Fifth haptic effect generator 322 and sixth haptic effect generator 324 may be configured to generate haptic effects in the Z direction along the Z axis 384.

In an example, a user wearing haptic device 300 may receive navigation directions via navigational system 350. The directions may be processed by controller 360 and compared with data received from one or more sensors 370. The data received from sensors 370 may comprise motion, position and/or other location information, or the like or combinations thereof. As the user moves, haptic device 300 may provide directional prompts via haptic effect generators 314-324. For example, if the user is deviating to the left first haptic effect generator 314 may vibrate indicating that the user should course correct direction by moving to the right. If the user is following the navigation directions haptic effect generators 324, 318 and 322 may vibrate in an associated, synchronized and/or otherwise coordinated repeating pattern with sixth haptic effect generator 324 vibrating first, third haptic effect generator 318 vibrating next and fifth haptic effect generator 322 vibrating last. Such an associated, synchronized and/or otherwise coordinated repeating pattern may provide constant feedback to the user to indicate that they are continuing on a correct course. In another example, some or all of haptic effect generators 314-324 may be configured to operate in various other patterns to provide coordinated haptic feedback.

In an example, the excitation of haptic effect generators 314-324 may be arranged to ramp on and off such that while one haptic effect generator is ramping on the preceding device in the sequence may be ramping off, thus rendering the sensation more analogic in nature. The ramping on or off of excitation may be linear or nonlinear in nature. Where the transition involves two or more of haptic effect generators 314-324 in a planar arrangement the haptic effect generators 314-324 may be arranged to simulate a number of touch gestures. For example, a transition between two haptic effects (either analogic or digital) can simulate a brush or drag between the devices, whereas three devices may allow a rotational like stimulation. In an example, providing two or three dimensional coordinated haptic effects along the X axis 380, Y axis 382 and/or the Z axis 384 may provide navigational feedback to a user of a remotely operated device.

In an example, haptic device 300 may be incorporated with a video game controller and may be configured to provide feedback to a user during game play. Navigational device 350 may be a GPU. During game play, a user may wear haptic effect device 300 while a user's game avatar is navigating through a game environment. The user may receive feedback regarding obstacles either static or moving in the gaming environment that the avatar may encounter via vibration or other haptic effects generated by haptic effect generators 314-324. For example, collisions on a left or right side of a user's game avatar may indicated by vibration in the appropriate haptic effect generator 314-324. Haptic effect generators 314-324 may produce any of a variety of haptic effects including vibration, tension, contour, temperature change, texture change and/or the like or combinations thereof to provide feedback about a variety of simulated physical phenomena that may be encountered by the user's avatar during game play.

Figure 4:
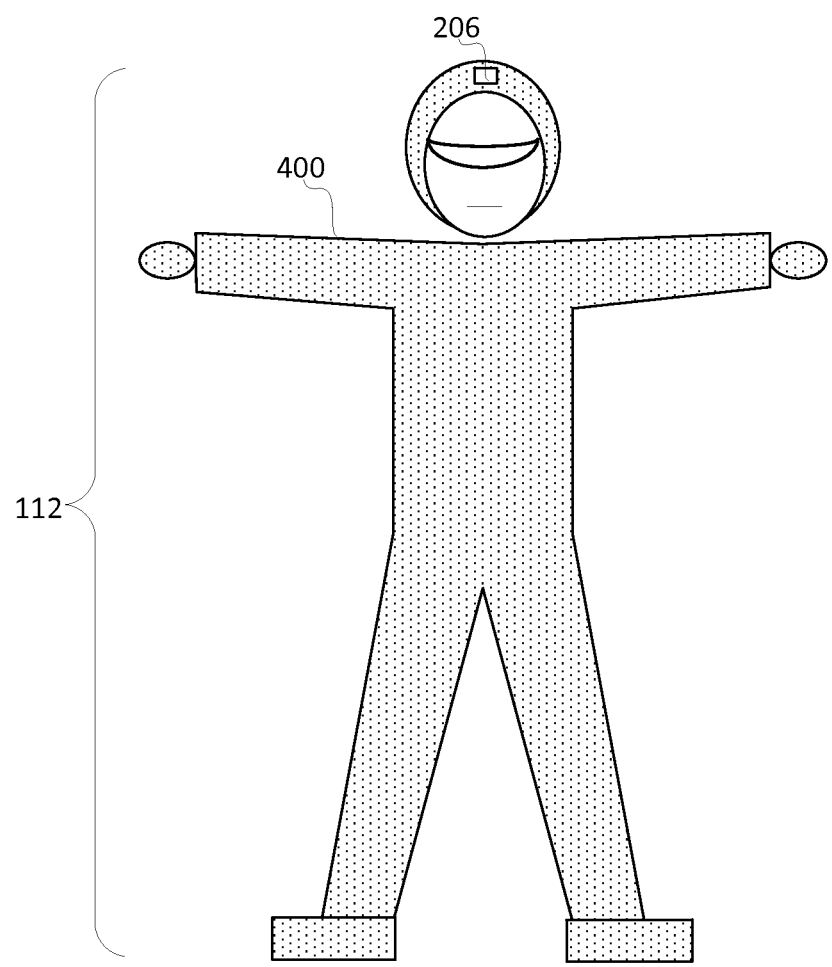
FIG. 4 illustrates an example of a haptic effect device.

FIG. 4 illustrates an example of a haptic effect device 400. Haptic effect device 400 may comprise a wearable computer/communications device. Haptic effect device 400 may be used in conjunction with virtual reality video games to provide an immersion experience to a user. In an example, haptic effect device 400 may comprise an array of haptic effect generators 112 (represented with dot pattern). Haptic effect generators 112 may be controlled by processor 206. As described above, processor 206 may receive trigger data, game data, user data, sensor data, status data or the like or a combination thereof. Processor 206 may coordinate haptic effects generated by the array of haptic effect generators to provide two or more haptic effects that are associated, synchronized and/or otherwise coordinated with one another. In an example, processor 206 may coordinate such haptic effects via a predetermined program. In an example, processor 206 may coordinate such haptic effects dynamically based on input data, status data, navigation data, sensor data or the like, or a combination thereof.

Figure 5:
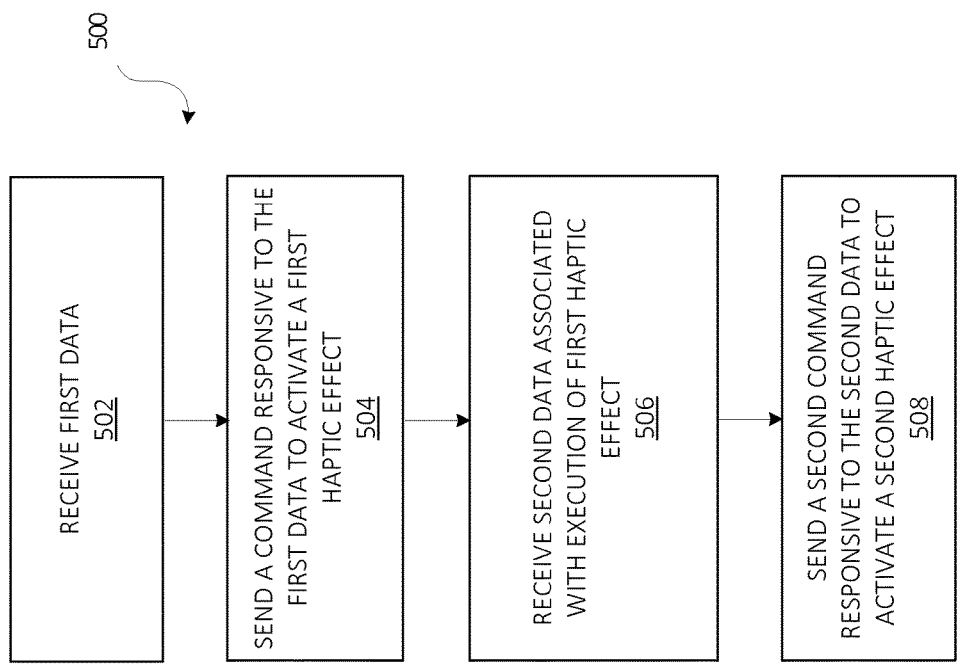
FIG. 5 illustrates an example of a process to activate two or more coordinated haptic effects.

FIG. 5 illustrates an example of a process 500 to activate two or more coordinated haptic effects. Process 500 begins at operation 502 where processor 106 receives first data. The first data may comprise trigger data, user input data, sensor data, game data and/or status data associated with a haptic effect device. At operation 504, processor 106 may send a first command responsive to the first data to activate a first haptic effect in a first haptic effect device. Processor 106 may select and/or dynamically generate the first command based on the first data, trigger data, user input data, sensor data, game data and/or status data, or a combination thereof. At operation 506, processor 106 may receive second data wherein the second data is associated with execution of the first haptic effect. The second data may also comprise trigger data, user input data, sensor data, game data and/or status data associated with the first haptic effect device. At operation 508, processor 106 may send a second command responsive to the second data to activate a second haptic effect in a second haptic effect device. Processor 106 may coordinate the first haptic effect and the second haptic effect to generate an associated, synchronized and/or otherwise coordinated series of haptic effects.

In an example, processor 106 and/or memory 118 may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processor 106 and/or memory 118 may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a conventional rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or the like, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Having described and illustrated the principles of examples, it should be apparent that the examples may be modified in arrangement and detail without departing from such principles. We claim all modifications and variations coming within the spirit and scope of the following claims.

What is claimed is:

1. A device to provide three dimensional contextual feedback along orthogonal axes comprising an X-axis, a Y-axis and a Z-axis, the device comprising:
   a wristband to be worn on a wrist of a user;
   first and second haptic effect generators disposed at an inner wrist area of the wristband and at an outer wrist area of the wristband, respectively, to generate a haptic effect in response to movement of the wrist of the user along the X-axis;
   third and fourth haptic effect generators disposed at an upper wrist area of the wristband and at a lower area of the wristband, respectively, to generate a haptic effect in response to movement of the wrist of the user along the Y-axis;
   fifth and sixth haptic effect generators disposed at a wrist area of the wristband closer to a hand of the user and at a wrist area of the wristband farther from the hand of the user, respectively, to generate a haptic effect in response to movement of the wrist of the user along the Z-axis; and
   a processor to coordinate operation of the second haptic effect generator with operation of the first haptic effect generator based on an input provided to the processor;
   wherein the first and second haptic effect generators, the third and fourth haptic effect generators, and the fifth and sixth haptic effect generators are individual generators and operate in a coordinated manner to provide three-dimensional and rotational feedback to the user.

2. The device of claim 1, wherein the haptic effect generated by any one or more of the first haptic effect generator, the second haptic effect generator, the third haptic effect generator, the fourth haptic effector generator, the fifth haptic effect generator, or the sixth haptic effect generator comprises a vibration, a tension, a pressure, a pain, a shape contour, a temperature change, or a texture change, or a combination thereof.

3. The device of claim 1, further comprising a user interface to provide the input to the processor, wherein the input is user input data, and wherein the processor is to access the user input data to coordinate the operation of any combination of the first haptic effect generator, the second haptic effect generator, the third haptic effect generator, the fourth haptic effector generator, the fifth haptic effect generator, or the sixth haptic effect generator.

4. The device of claim 1, wherein at least one haptic effect generator is to provide the input to the processor, wherein the input is status data, and wherein the processor is to access the status data to coordinate the operation of any combination of the first haptic effect generator, the second haptic effect generator, the third haptic effect generator, the fourth haptic effector generator, the fifth haptic effect generator, or the sixth haptic effect generator.

5. The device of claim 1, further comprising a sensor to provide the input to the processor, wherein the input is sensor data, and wherein the processor is to access the sensor data to coordinate the operation of any combination of the first haptic effect generator, the second haptic effect generator, the third haptic effect generator, the fourth haptic effector generator, the fifth haptic effect generator, or the sixth haptic effect generator.

6. The device of claim 5, wherein the sensor is a location sensor, a motion sensor, a touch sensor, a light sensor, a biometric sensor, a current sensor, a thermal sensor, a pressure sensor or a combination thereof.

7. The device of claim 1, wherein the processor is to receive the input from a Graphics Processing Unit (GPU), wherein the input is game data, and wherein the processor is to access the game data to coordinate the operation of any combination of the first haptic effect generator, the second haptic effect generator, the third haptic effect generator, the fourth haptic effector generator, the fifth haptic effect generator, or the sixth haptic effect generator.

8. The device of claim 1, wherein the processor is to receive the input from a navigation device, wherein the input is navigational directions, and wherein the processor is to access the navigational directions to coordinate the operation of any combination of the first haptic effect generator, the second haptic effect generator, the third haptic effect generator, the fourth haptic effector generator, the fifth haptic effect generator, or the sixth haptic effect generator.

9. The device of claim 1, wherein the device comprises a component of a video game controller, a mobile communications device, a mobile computing device, a tablet, a notebook, a detachable slate device, an Ultrabook™ system, a wearable communications device, a personal computer, a wearable computer, a smart shoe, an entertainment device, an electronic device, a wearable electronic device or a combination thereof.

10. The device of claim 1, wherein one haptic effect is a vibration having a first amplitude, wherein the processor is to select a command to activate a vibration by another haptic effect generator to produce the vibration having a second amplitude, wherein the second amplitude is associated with the first amplitude based on the input wherein the input is sensor data.

11. The device of claim 10, wherein the first amplitude corresponds to a first measured parameter identified in the sensor data and the second amplitude corresponds to a second measured parameter identified in the sensor data.

* * * * *